July 1, 1969   C. F. PHILLIPS ET AL   3,452,591
APPARATUS FOR TESTING FUEL PUMPS
Filed May 11, 1967

INVENTORS
CLAUDE F. PHILLIPS
WILLIAM RUSSELL PARRENT

BY

ATTORNEY

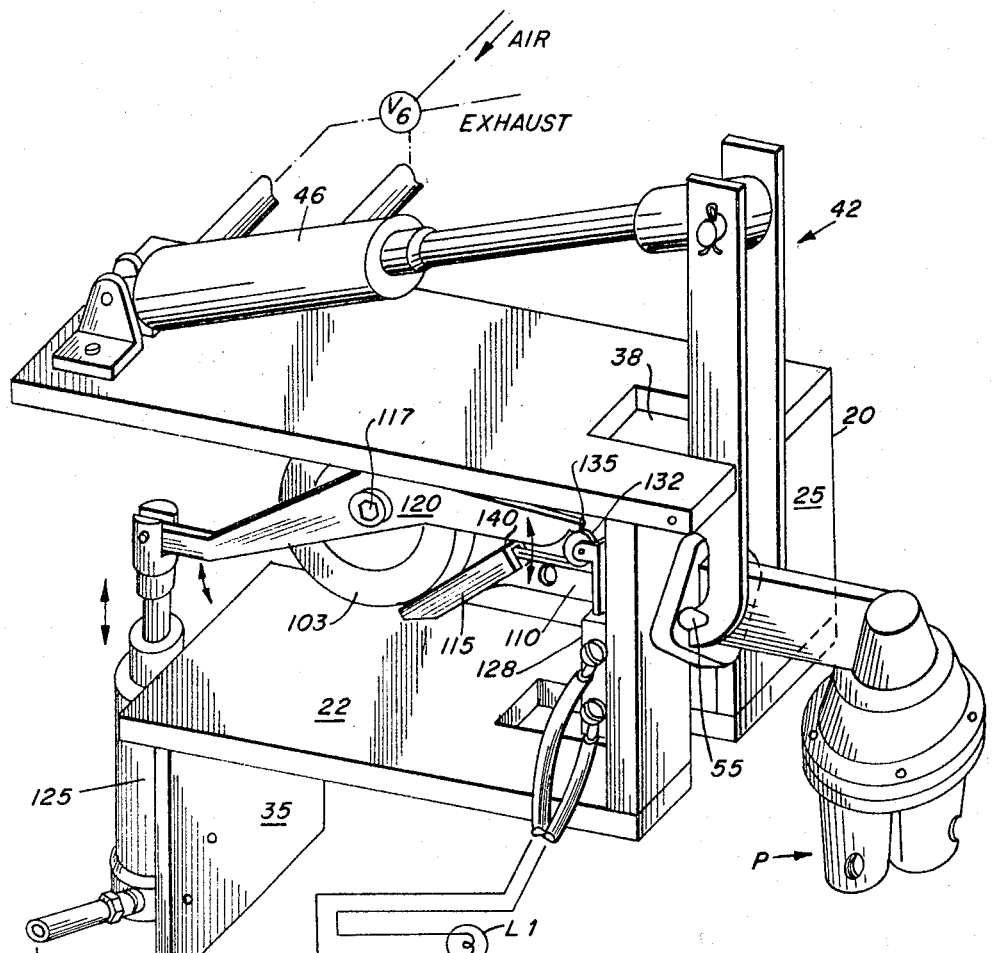
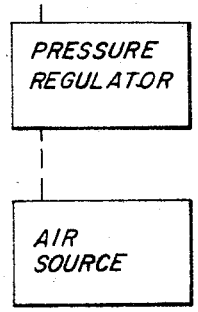
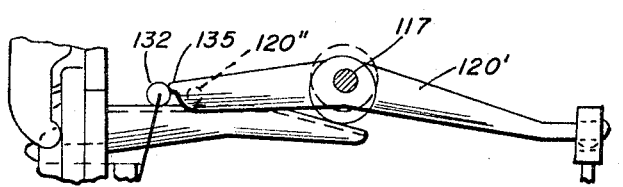
Fig. 2
Fig. 4
INVENTORS
CLAUDE F. PHILLIPS
WILLIAM RUSSEL PARRENT

United States Patent Office 3,452,591
Patented July 1, 1969

3,452,591
APPARATUS FOR TESTING FUEL PUMPS
Claude F. Phillips and William Russell Parrent, Fairfield, Ill., assignors to Airtex Products, Division of United Industrial Syndicate, New York, N.Y., a corporation of New York
Filed May 11, 1967, Ser. No. 637,718
Int. Cl. G01m *13/02*
U.S. Cl. 73—118                                   9 Claims

ABSTRACT OF THE DISCLOSURE

The invention relates to an apparatus for testing gasoline vehicle fuel pumps comprising a test stand and interchangeable test blocks to which pumps are clamped and subjected to a sequence of tests for acceptable discharge quantity or flow rate, clearance to permit overstroke of the pump lever, maximum and minimum outlet pressure, and intake vacuum. The arrangement is such that the pump is actuated by a rotary cam which is part of an interchangeable test block assembly. Pumps of different types and sizes have respective test blocks. The cam of each test block is the same type and size that would be found in an engine for which the specific pump is intended and which actuates the fuel pump of such engine.

Field of the invention

The field of the invention is an apparatus for performing a sequence of tests on liquid fuel pumps wherein the medium pumped is air, rather than a liquid, for test purposes.

Description of the prior art

Fuel pumps have heretofore been tested by a series of separate tests utilizing both air and liquid. Such prior art testing apparatus has been cumbersome and relatively expensive requiring a variety of different types of gauges and the making of a number of connections.

The present invention provides rapid and convenient securing of pumps to a test stand and a sequence of tests rapidly performed in a manner not possible with prior art apparatus.

Summary of the invention

The invention comprises an apparatus wherein a test stand can accommodate a plurality of different test blocks which are designed to accommodate and actuate respective types of pumps. Each test block is fitted with a pneumatically actuated clamp for quickly clamping a pump thereto and also with a rotary cam for actuating the lever of a pump clamped thereto as well as with a means for actuating the lever beyond the extent provided by the rotary cam in order to ascertain that the pump interior has sufficient size to permit the lever to rock beyond the degree expected in normal use without effecting an interference of parts that would damage the pump or engine parts. A universally adjustable connection means which can be set to coact with different sizes and designs of pumps for effecting hose connections to the ports thereof automatically by pneumatic power under control of valving is provided. Once hose connections are made to the ports, a series of tests is instituted by opening and closing air valves. The first test is for flow rate, then overstroke movement of the pump lever, and subsequently for maximum and minimum outlet pressure and finally inlet vacuum. The fluid used for testing is air instead of a liquid since it has been found that liquid fuel pump performance can be accurately ascertained by the use of air as a test medium. The use of air is considerably more convenient than liquid from a standpoint of connections and ease of handling of the apparatus. A series of indicator lamps is used so that the test operator is apprised, step by step, if a pump has passed all tests. As a practical matter, the valving during a sequence of tests is performed by automatic control circuitry which, however, is not part of the present invention; accordingly, for purposes of this disclosure the valve control will be described as being performed manually so as to illustrate how the apparatus is used and to provide a basis for claiming a complete combination.

Brief description of the drawing

FIG. 2 is an enlarged perspective view of a pump test block; and

FIG. 4 is an elevation of the essential components of the overstroke testing mechanism, utilizing a slightly modified overstroke arm.

Description of the invention

Figure 1:
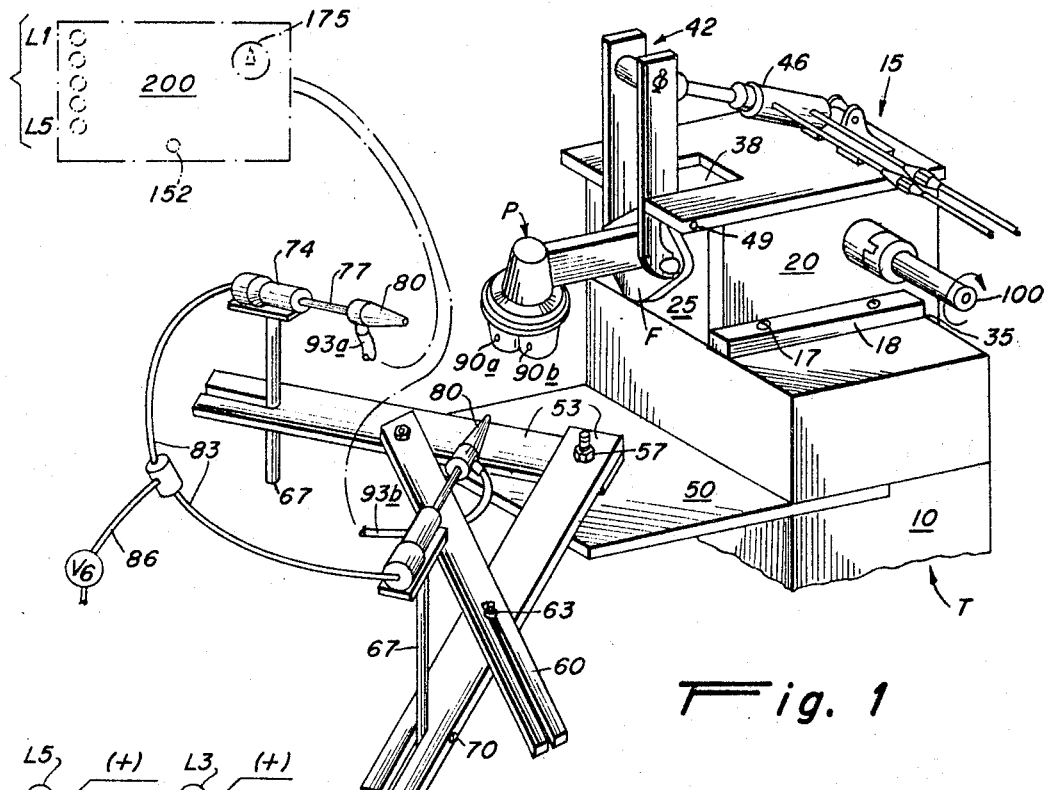
FIG. 1 is a perspective view showing the major components of the invention as to the test stand with a test block thereon.

Referring to FIG. 1 of the drawing, the invention comprises a test stand T having a base 10 carrying a test block housing 15 which is removably attachable to the base as by bolts 17 through the block flange 18. The test block housing comprises a side wall 20, a bottom wall 22, a front wall 25, a top wall 30, and a flange 35 which abuts the rear of base 10 when flange 18 is bolted to base 10. The housing may be of any suitable metal plate construction as a matter of design. The top wall is provided with a slot 38 in which is rockably mounted a clamp lever arrangement 42 actuable by a double acting pneumatic cylinder 46, manually controlled by valve Vc for feed and exhaust, the lever being rockable about the pivot pin 49 so that the lower end of the clamp can engage and secure a conventional flange F of a pump P against the housing 15 for tests purposes. Locator pins such as 55 are carried by wall 25 to protrude through the bolt holes of the pump flange to accurately locate the pump on the block.

A plate 50 of the test stand extends outwardly and carries a pair of pivotal arms 53 which are angularly adjustable about the pivot bolt 57 and secured in angularly adjusted position by means of a slotted arm 60 and locking bolt 63. Each arm 53 carries a support shaft 67 which can be rotated about a vertical axis and set in any desired position as by a setscrew 70 and the upper end of each said rod carries a pneumatic cylinder 74 having a piston rod 77 at the end of which a resilient rubber nozzle-like plug 80 is carried. The pneumatic cylinders 74 are coupled to airlines 83 so that a common compressed air feed 86 can serve to move the pistons forwardly. Thus, the connector plugs 80 will sealingly engage with respective ports 90a and 90b of the fuel pump for air flow communication through flexible hoses 93a and 93b as inlet and outlet conduits, respectively.

It will be understood from the above description that a fuel pump of any conventional configuration can be set up for test and with the proper angular setting and height adjustment of the connector plugs 80, such plugs can be moved into sealed flow communication with the pump ports or retracted therefrom by actuation of air cylinders 74 which are single acting spring return type.

A rotary shaft 100 powered by an electric motor (not shown) is provided with positive coupling for a rotary pump actuating cam 103 suitably journaled in side wall 20, as will be understood from FIG. 2. The front wall 25 is slotted so that the lever arm 100 of the pump can pass therethrough whereby the cam follower pad 115 can be engaged by cam 103 whence rotation of the cam effects actuation of the pump lever arm in the same manner in which it would be actuated on an engine.

It will be noted that the cam is continuously rotating and that pumps are secured to the test block by moving their actuating levers into engagement with the rotating cam, suitable use of the locator pins 55 being made and subsequent pneumatic actuation of the clamp device 42, via cylinder 46 through valve control V6.

An arrangement for effecting an overstroke test comprises an overstroke lever 120 rockable on the cam support shaft 117 so that it can be rotated about the cam axis for a predetermined extent by a single acting spring return pneumatic cylinder 125.

Arm 120' is channel-like in FIG. 4 and has a cross pin 120'' which can engage a fuel pump lever to press it down.

A microswitch 128 is fastened to the housing and has a roller 132 disposed over lever 110 and engageable by the tip 135 of the airstroke test lever 120. Thus, if there is sufficient accommodation within the pump housing for pump lever 110 to move to the extent effected by motion of arm 120 engaging a selected point such as 140 on the pump lever, tip 135 will actuate the switch 132 to complete a circuit to lamp L1. This shows that the pump provides sufficient accommodation for overstroke and there is no danger of pump breakage due to poor positioning on an engine or use with an oversized pump operating cam.

The cylinder 125 is pressurized through a pressure regulator to prevent a damaging force being brought to bear in the event that a pump under test has internal interference which prevents full overstroke test movement.

Incorrect assembly of a pump which would prevent the necessary movement of the pump lever is also detected by the overstroke test.

Figure 3:
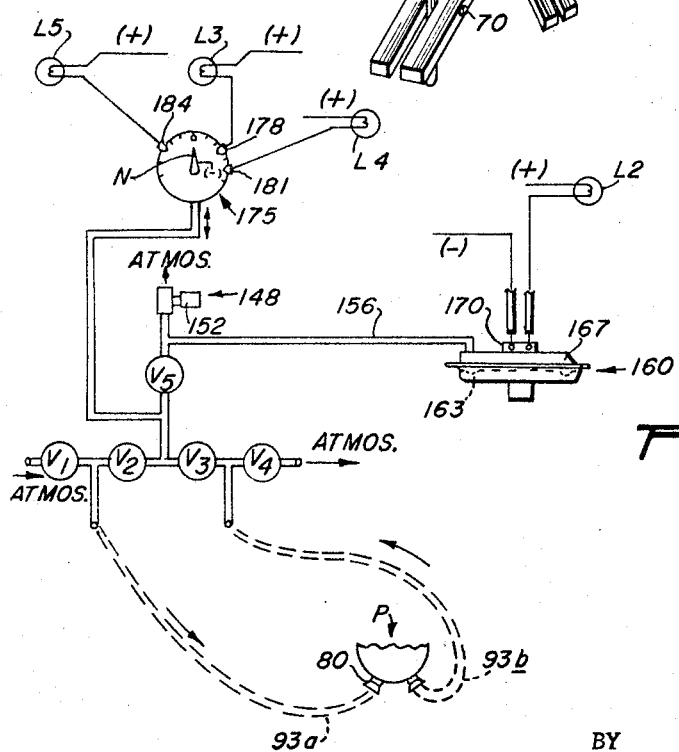
FIG. 3 is a diagrammatic illustration of a valve control arrangement.

A quantity discharge or flow test is accomplished by the arrangement shown in FIG. 3 wherein the pump outlet hose 93b is connected via valves and piping to be explained to a regulatable orifice device 148 wherein a manually operable knob 152 can control the amount of air leakage to atmosphere through the orifice element. The device 148 is a commercially obtainable part made by Alkon Products Corp., Hawthorne, N.J.; Model JF-1. Thus, the pump being actuated continuously by the cam pumps air through the outlet hose 93b to the orifice member 148 (via valving control) some of which passes via hose 156 to a pressure operated switch device 160 having diaphragm 163 which, upon sufficient depression due to accumulated air under pressure in the diaphragm chamber 167, operates microswitch 170. Operation of the switch manifests a signal, as indicated by lamp L2. The device 160 is made by F. W. Dwyer Mfg. Corp., Michigan City, Ind.; Model 1820. The mode of use requires that the chamber 167 must have an accumulated pressure sufficient to operate switch 170 within a predetermined period of time, 4 seconds for example being provided for practical operation, and if switch 170 is not operated within that time, the pump fails the flow test. The purpose of the orifice member is to provide a respective predetermined leakage of outlet flow for respective types of pumps. Accordingly, the arrangement can be calibrated by the use of a pump of known acceptable quantity discharge rate for all pumps of that type and size.

Maximum and minimum outlet pressure testing is accomplished by means of a commercially obtainable component, vacuum-pressure gage 175 made by The Instrument Laboratory, Inc., Portland, Oreg., Model Mon-O-Con 1803A. For purposes of present disclosure the photoelectric pickoff system of this gage need not be described. However, the gage has a movable needle rotatable in either direction from the zero position. When aligned with the variably settable indicators such as 178 for minimum pressure, 181 for maximum pressure and 184 for vacuum, indicator means such as lamps L3, L4, L5, respectively, are energized. For purposes of symbolic presentation the gage needle is represented as connected to the negative terminal of a power source (not shown) all lamps having positive and negative connections as indicated.

From the above description it will be apparent that the test block, as shown in FIG. 2, is a completely integral unit which may be bolted to the test platform 10 and the cylinders 46 and 125 suitably coupled to air sources wherein the valving Vc controls the double ended cylinder 46 and the valving V7 controls the single ended spring return cylinder 125 for overstroke testing. Likewise, it will be noted that the cable from switch 128 can be extended to an indicator panel 200 (FIG. 1) on which may be mounted all of the indicator lamps such as L1 together with the gage 175 and the bleed orifice control knob 152.

For purposes of simplification the wiring to the panel is not shown since it is illustrated schematically in FIG. 3 wherein it will be noted that a series of two-way valves V1, V2, V3, V4 and V5 permit or block passage of air through the respective pipe sections in which they are disposed. The pipe sections extend from tubing 93a and 93b of the inlet and outlet of the pump P, as will be readily understood. The various lamps L1, L2, L3, L4 and L5 will be understood to be connected so as to be energized under certain circumstances to indicate successful passing of respective tests, one terminal of each lamp being shown as connected to positive for purposes of identification, it being understood that the other terminal is connected to the negative side of a power line responsive to closing of a switch indicating passing of a test in each instance.

In use, the first step would be, of course, to actuate the valve Vc to clamp and hold a pump on the test block and thereafter to actuate valve V6 so as to connect the nozzles 80 with the respective pump ports. Thereafter, the series of tests may be performed in any sequence although an actual working model utilizing fully automatic control involving a cam type timer and solenoid valves perform the tests in the following sequence:

Flow
Overstroke
Minimum and maximum outlet pressure
Vacuum at inlet

It being understood that the cam which operates the pump lever is continuously rotating, at a fixed rate of 200 r.p.m. at the time the pump lever is moved against it, it is considered advisable to do the flow test before the overstroke test. Assuming this to be the case, the following table discloses the valves to be opened and closed for each test. Thus for the flow test:

V1 open
V2 closed
V3 open
V4 closed
V5 open

It will be noted that the last valve to be closed is V5 and assuming that the pressure responsive device 160 has been calibrated by means of an acceptable pump, say for a 4 second discharge into the diaphragm chamber, the valve V5 is held open for 4 seconds. It will, of course, be understood that this can be done readily with any type of manual valve, the operator watching the second hand of a clock, or with a valve which is automatically timed. If the lamp L2 goes on within the 4 second interval, then the flow test has been passed.

For the overstroke test:

V1 open
V2 closed
V3 closed

V4 open
V7 open

Lamp L1 energized if pump passes.
For minimum and maximum pressure test at outlet:

V1 open
V2 closed
V3 open
V4 closed
V5 closed

As hereinabove mentioned the vacuum gage 175 is of highly sophisticated type using a photoelectric pickoff but for all practical purposes, insofar as explanation of the invention is concerned, a simple contact type of gage may be utilized wherein touching of the gage needle with the indicators 178, 181, 184, considered as contacts fixed at predetermined pressures, will cause the lamps to light.

Thus, in FIG. 3 contact between the needle and the indicator 178 will cause energization of L3, and contact with the indicator 181 will cause energization of lamp L4, to show passing of respectively, minimum and maximum pressure tests.

For the vacuum test at inlet:

V1 closed
V2 open
V3 closed
V4 open
V5 closed

In this instance the needle would swing counterclockwise to effect contact with the indicator 184 if sufficient vacuum at the pump intake is effected, thereby energizing lamp L5 to show passing of the vacuum test.

We claim:

1. In a testing apparatus for lever operated fuel pumps, a pump support means, a rotary cam for continuously actuating a pump lever, overstroke testing means independently operable of said cam for moving said pump lever to a predetermined extent beyond that effected by said cam, and indicator means for indicating the successful movement of said pump lever to said predetermined extent.

2. In a testing apparatus as set forth in claim 1, wherein said overstroke testing means comprises a lever and means for effecting rockable support about the rotary axis of said cam and actuating means for said overstroke testing lever, said overstroke testing lever having an end disposed to engage a pump lever so as to effect movement thereof independently of rotation of said cam.

3. In a testing apparatus as set forth in claim 1, wherein said overstroke testing means comprises a lever and means for effecting rockable support about the rotary axis of said cam and actuating means for said overstroke testing lever, said overstroke testing lever having an end disposed to engage a pump lever so as to effect movement thereof independently of rotation of said cam, said indicator means comprising a microswitch engageable by said overstroke testing lever.

4. In a fuel pump testing apparatus for testing fuel pumps having a connecting flange and a pump actuating lever and having outlet ports, pump support means comprising a movable clamp member and a clamp wall, means mounting said clamp member for movement towards or away from said wall operable to clamp the flange of a pump against said wall for securement thereto in testing position, or to release said flange, said wall having an opening through which the lever of said pump can extend, a rotary cam disposed to engage said pump lever when extending through said wall and being supported by said pump support means whereby said pump support means comprises an integral unit constructed and arranged for securement and actuation of a pump to be tested.

5. In a testing apparatus as set forth in claim 4, and a test stand having connection means for effecting connection to said inlet and outlet ports, said pump support means being detachably secured thereto.

6. In a fuel testing apparatus as set forth in claim 4, said pump support means having a shaft for rotatively supporting said cam and said shaft carrying an overstroke test lever rockable thereon and engageable with said pump lever to actuate said lever to an extent beyond that provided by said cam, and means connected to said overstroke lever to effect actuation thereof for overstroke testing.

7. In a testing apparatus as set forth in claim 4, and a test stand having connection means for effecting connection to said inlet and outlet ports, said pump support means being interchangeably secured thereto, said connection means comprising individually movable connector plugs carried on respective arms, said arms and plugs being angularly adjustable in horizontal planes and said plugs being also vertically adjustable.

8. In a testing apparatus as set forth in claim 4, and a test stand having connection means for effecting connection to said inlet and outlet ports, said pump support means being detachably secured thereto, said connection means comprising individually movable connector plugs carried on respective arms, said arms and plugs being angularly adjustable in horizontal planes and said plugs being also vertically adjustable, a pneumatic actuating cylinder for each of said plugs, each said cylinder having a piston rod carrying a respective plus, a support rod for each said cylinder, each said support rod being carried by a respective arm and being vertically and rotationally adjustable therein, and hose means connected to said plugs for effecting communication through respective plugs to respective pump ports.

9. In an apparatus for testing fuel pumps, a test block for removable attachment to a test stand comprising a housing having a slotted wall for entry therethrough of the lever of a fuel pump to be tested, and clamping means for clamping said fuel pump against said wall, said housing having another wall for bearing support of a rotary cam, an overstroke testing lever carried by said housing and disposed to abut with said pump lever for actuation thereof independently of said cam, a pneumatic cylinder carried by said housing to actuate said clamping means and an additional pneumatic cylinder carried by said housing to actuate said overstroke test lever.

References Cited

UNITED STATES PATENTS

| | | | |
|---|---|---|---|
| 2,145,401 | 1/1939 | MacBride | 73—118 |
| 2,306,461 | 12/1942 | Miller | 73—118 X |
| 2,568,905 | 9/1951 | Wiehsner | 269—25 X |
| 3,340,728 | 9/1967 | Taylor et al. | 73—118 |

FOREIGN PATENTS 599,344  3/1948  Great Britain.

RICHARD C. QUEISSER, *Primary Examiner.*
JERRY W. MYRACLE, *Assistant Examiner.*

U.S. Cl. X.R.
269—25, 126